Jan. 2, 1968  L. BAUER  3,361,223
SYNCHRONIZED HYDRAULIC FRONT WHEEL DRIVE
Filed Jan. 25, 1965

*INVENTOR.*
LEO BAUER
BY~ *Maybee & Legris*
ATTORNEYS

United States Patent Office 3,361,223
Patented Jan. 2, 1968

3,361,223
SYNCHRONIZED HYDRAULIC FRONT WHEEL DRIVE
Leo Bauer, Willowdale, Ontario, Canada, assignor to Levy Industries Limited, Toronto, Ontario, Canada, a company
Filed Jan. 25, 1965, Ser. No. 427,897
Claims priority, application Canada, Jan. 31, 1964, 894,501
10 Claims. (Cl. 180—44)

This invention, in general aspects, relates to power drives of front wheels of tractors and a variety of self-propelled farm machinery, earth moving equipment, etc.

In more particular aspects this invention relates to fluid power drives of self-propelled vehicles.

In still more particular aspects this invention relates to fluid front axle power drives of self-propelled vehicles, in where there is complete synchronization of wheels of the front axle with the wheels of the other axle which is driven through a conventional mechanical train.

In prior art the front wheels of the tractor are driven by conventional gear reduction units, connected by a mechanical differential to which the power is supplied from the internal combustion engine. Since in conventional four (4) wheel drive tractors the front wheels are used for steering, the additional requirement of the rotation of the wheel about its axis of suspension makes the mechanical drive cumbersome, complicated and costly. The mechanical drive of such a type, well known in the art, suffers from an additional serious disadvantage. Since the differentials of the front and rear axles are mechanically inter-connected, the difference in the ground configuration and especially difference in the loaded radius of the front or back wheels, either due to change in weight of the vehicle, change in air pressure in the tires or actual wear of tread of the tires, will produce a slipping motion between the ground and the tire surface. Only the pure rolling motion, with no wheel slip, can achieve the maximum tractive efficiency of the overall drive. Under conditions of tire slip, induced by mechanical front wheel drive, not only will the engine power be wasted, but severe wear of the tires will take place. In the mechanical front wheel drive, the front and rear wheels are never exactly synchronized and to some extent fight each other. Assuming that the loaded radius of the front tires would be decreased by either mounting a front implement on the tractor or due to loss of the pressure in the tires, for any specific distance travelled by the tractor the linear distance covered by the back wheels will be larger than that covered by the front wheels. Since back and front wheels are connected by the tractor frame and since the tractor will cover a distance probably smaller than the distance that would be covered by the rear wheels and larger than the distance that would be covered by the front wheels under free rolling condition, the back wheels will slip and the front wheels will be dragged through a percentage of the distance, equivalent to the difference in the loaded radius from the ideal condition of no slip. The disadvantage of this parasitic effect is self-evident.

It is therefore an object of this invention to provide a new and improved front wheel drive, which will automatically synchronize front and back wheels to obtain an idealized minimum slip condition.

Another object of this invention is to provide a completely synchronized front wheel drive, in which the level of the power, or the magnitude of the driving torque is maintained constant, irrespective of the driving torque at the back wheels.

Another object of this invention is to provide a synchronized front wheel drive in which the power level or the driving torque, supplied to the front wheels, can be adjusted between maximum and minimum limits by the operator, while driving.

Still another object of this invention is to provide a fluid power synchronized front wheel drive which can be easily mounted as an accessory on the conventional types of tractors.

Other objects and advantages will become apparent, reference being had to the accompanying drawings and description in which.

Although the front wheel drive is shown applied to a tractor, the same principle can be used in different combinations when applied to different types of self-propelled vehicles.

Figure 1:
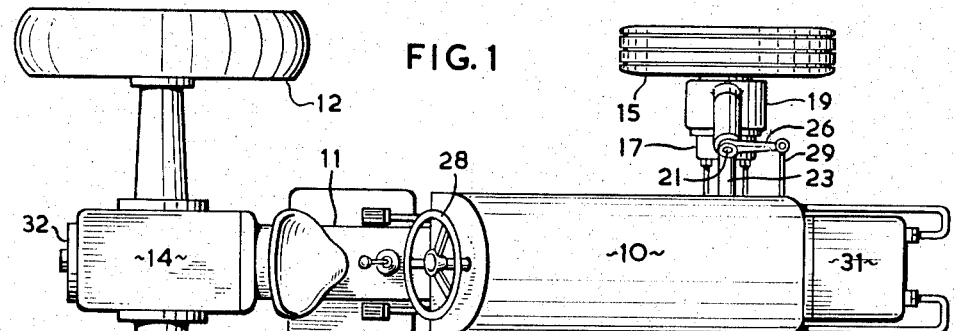
FIG. 1 is a diagrammatic plan view of a tractor, showing mounting of the fluid motors and a representative mounting of the fluid pump.
Figure 3A:
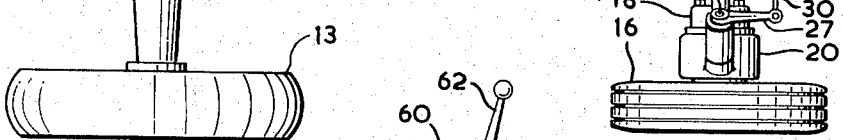
FIGURE 3a is a fragmentary view of a simple form of automatic control.
Figure 3:
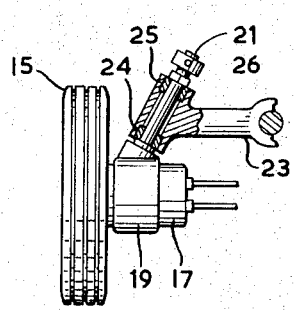
FIGURE 3 is a part end section elevation of the tractor front axle, showing mounting of the fluid motor in respect to front driving wheel.

Referring now to FIGURE 1, the engine 10 is mounted on frame 11. The driving wheels 12 and 13 are driven, in a well known manner, by mechanical transmission 14, connected to engine 10. The steering wheels 15 and 16 are drivingly connected to hydraulic motors 17 and 18. The mechanical gear reduction units 19 and 20 are interposed between hydraulic motor 17 and steering wheel 15 and hydraulic motor 18 and steering wheel 16 respectively. The steering wheel assemblies consisting of: a steering wheel, mechanical gear reduction unit and hydraulic motor, are pivotally mounted by king pins 21 and 22 to front axle 23. Suitable anti-friction bearings 24 and 25 mount the king pin 21 in respect to front axle 23, see FIGURE 3. Referring now back to FIGURE 1, the steering arms 26 and 27 are connected to the king pins 21 and 22. The steering arms 26 and 27 in a well known manner, are actuated by wheel 28 through tie rods 29 and 30. The variable displacement pump 31 is shown mounted on the front of the tractor, although it could be mounted on power take-off 32.

Figure 2:
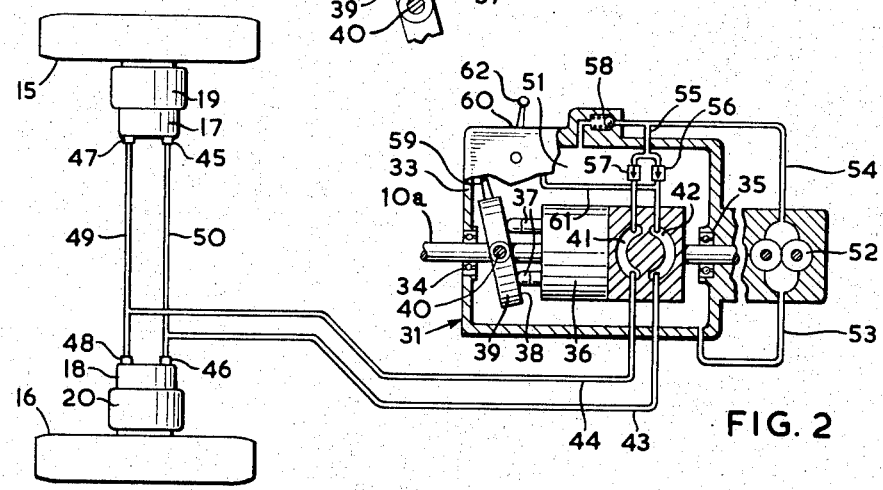
FIGURE 2 is a schematic representation of the fluid connections between fluid motors and pump, the pump being shown in section, the pump components being diagrammatically rearranged to better illustrate its principle of operation.

Referring now to FIGURE 2, the variable displacement pump, generally designated as 31, for purposes of illustration, is shown with its working components diagrammatically disposed. The rotary motion from the engine 10 is supplied to pump drive shaft 10a, suitably retained in pump housing 33 by bearings 34 and 35. The rotary motion of the drive shaft 10a is transmitted to the pump cylinder barrel 36, equipped with cylinder bores guiding multiplicity of pistons 37. The pistons 37 abut against inclined surface 38 of trunnion 39. The trunnion 39 is mounted for limited rotation in respect to pump housing 33 by pivot 40. The rotation of the cylinder barrel 36 will induce reciprocating motion in pistons 37. The hydraulic oil, displaced by this reciprocating motion of the pistons 37 is phased, in a well known manner, into timing ports 41 and 42, connected to the pump inlet and outlet ports 43 and 44. Referring now back to FIGURE 2, depending on direction of rotation of the drive shaft 10a, either timing port 41 or 42 will be the high pressure port. Assume that timing port 42 is the high pressure port. The high pressure oil from the timing port 42 is conducted through the ducts 43 and 50 to the high pressure ports 45 and 46 of fluid motors 17 and 18 respectively. The low pressure oil from the low pressure motor ports 47 and 48 is conducted through ducts 49 and 44 to the low pressure timing port 41. The pump housing 33 defines a chamber 51 which contains a supply of hydraulic oil. A conventional gear pump 52 draws oil through duct 53 from chamber 51 and supplies it at relatively low pressure through ducts 54 and 55 to check valves 56 and 57. With the timing port 42 being the high pressure port the check valve 56 will remain closed. Since the timing port 41 is the low pressure port, the oil supplied from the gear pump 52 will flow through check valve 57 into the timing port 41, supplying the make-up oil lost in leakage in pump 31 and hydraulic motors 17 and 18. The excess of make-up oil supplied by gear pump 52 is spilled through low pressure relief valve 58 back to chamber 51; at any specified level of r.p.m. of drive shaft 10a, the volume output of pump 31 depends on angle of inclination of the surface 38 of trunnion 39. Since the trunnion 39 is mounted for rotation around pivot 40, the volume output of the pump can be controlled and varied by rotation of trunnion 39. The trunnion 39 is rotated around pivot 40 through extension arm 59, connected to automatic control 60. This is an automatic pump control, well known in the art, and it performs in the following fashion:

The discharge pressure signal is fed to automatic control 61. The trunnion 39 is biased towards its maximum angle of inclination, corresponding to the maximum pump flow, by a control spring. The force of the control spring is appeased by hydraulic cylinder piston combination, subjected to hydraulic pressure, conducted through duct 61. Once a certain discharge pressure is reached the discharge pressure acting on the area of the piston will overcome the pre-load in the control spring and rotate the trunnion 39 towards position of smaller displacement. In this way the pump displacement will vary to maintain relatively constant pressure at the pump output. It should be noted, that the control spring will inherently vary the biasing force applied to the trunnion depending upon the angle of the trunnion. The amount of variation is dependent upon the spring rate, which is an inherent characteristic of the spring as is well known in the art. Therefore, a higher pressure will be needed to move the trunnion when it is at a minimum angle, than when it is at a maximum angle, and hence the pressure discharge at the minimum and maximum angles will vary in amount corresponding to the spring rate. This difference is dictated by the design characteristics and may not be negligible. Thus, the terms "constant pressure" and "relatively constant pressure" are used herein as they are used in the art to include this inherent pressure variation between minimum and maximum trunnion angle. The actual level of the relatively constant discharge pressure can be adjusted by control handle 62, which will change the pre-load of the control spring. To illustrate the basic principle of automatic control operation, the simplest form of such a control, generally described above, is shown in FIGURE 3a. At the same time it should be noted that to make the transmission fully reversible, the duct 61 should not be connected directly to the high pressure timing port 42, but through two check valves to both ports 41 and 42. In this way, irrespective of which port is the high pressure port, the pressure signal will always be transmitted through duct 61 to the automatic control 60.

Since the fluid pump 31 will supply oil at constant pressure to the fluid motors 17 and 18, these motors will drive the steering wheels of the tractor at constant torque level. Of course the torque will inherently vary with the inherent variation in fluid discharge pressure due to the spring rate as discussed above. Hence the term "constant torque" and "relatively constant torque" are intended to include this inherent variation in torque. With increase in speed, the pump displacement will automatically increase, still maintaining constant pressure. Conversely if engine r.p.m. increases, resulting in an increased volume output of the pump, the control will automatically change the pump displacement to maintain the same driving torque at the steering wheels. Since the steering wheels are synchronized with the driving wheels by the ground surface and since the steering wheels, while supporting the same torque, can revolve at any speed between maximum and minimum, the front wheels and back wheels of the tractor are always in the state of perfect synchronization.

By selecting any desired constant pressure level of hydrostatic transmission by movement of the control lever 62, the driving torque, supplied to the front wheels, can be varied at will by the operator. In this way the contribution of the driving torque of the front wheels of the tractor to the driving effort of the tractor can be selected within the range of maximum power transmission capabilities of the front wheel drive.

What I claim as my invention is:

1. In a self-propelled vehicle having a frame, an engine driving wheels mounted on said frame, mechanical power transmission means interposed between said engine and said driving wheels and steering wheels pivotally mounted on said frame; the combination therewith of a fluid power transmission and control system comprising: a fluid motor drivingly connected to each of said steering wheels, a variable displacement fluid pump mounted on said frame and driven by said engine, fluid conducting means between said variable displacement pump and said fluid motors, and control means for said variable displacement pump to vary the fluid displacement of said pump to maintain a relatively constant pressure at said fluid pump, whereby fluid at constant pressure is supplied to said fluid motors throughout their useful range of speed to supply synchronized driving power to said wheels throughout their useful range of speed.

2. The combination of claim 1, in which a mechanical speed reduction means is interposed between each said fluid motor and its associated steering wheel.

3. The combination of claim 1, in which said fluid conducting means between said fluid pump and said fluid motors comprise flexible duct means whereby the steering motion can be supplied to said steering wheels, while supplying the fluid power to said fluid motors.

4. The combination of claim 1, wherein said control means for said variable pump includes spring means normally biasing said pump to its maximum displacement, and pressure responsive means operative in opposition to said spring means to reduce said displacement in response to pressure increase.

5. The combination of claim 4, wherein said pressure responsive means includes plunger means operable responsive to pressure fluid from said pump.

6. The combination of claim 4 further characterized by means to selectively vary the pre-load in said spring whereby said constant discharge pressure can be changed.

7. The combination of claim 6, wherein said means to vary the pre-load in said spring includes operator controlled lever means movable to a plurality of operable positions.

8. The combination of claim 1 further characterized by means to operate said fluid transmission in both forward and reverse directions.

9. In a self-propelled vehicle having a frame, an engine mounted on said frame, and first and second sets of drive wheels, a primary drive system interposed between said engine and said first set of drive wheels and control means to vary the speed of said primary drive system to vary the speed of the vehicle, the combination therewith of an auxiliary fluid power transmission and control system including fluid pump and motor means interposed between said engine and said second set of drive wheels, said auxiliary fluid power transmission and control system including control means to supply relatively constant torque output to said second set of drive wheels, whereby said auxiliary system will contribute constant driving torque to said self-propelled vehicle while remaining in a condition of speed synchronization with the speed control of said primary drive.

10. The combination of claim 9 further characterized by said control means including means to supply said fluid motor means with constant fluid discharge pressure.

References Cited

UNITED STATES PATENTS

| | | | |
|---|---|---|---|
| 2,421,013 | 5/1947 | Cornwell | 180—66 X |
| 2,430,528 | 11/1947 | Moon | 180—10 |
| 2,741,989 | 4/1956 | Postel et al. | 60—53 X |
| 3,053,043 | 9/1962 | Knowler | 180—66 X |
| 3,180,080 | 4/1965 | Budzich et al. | |

FOREIGN PATENTS 791,903  3/1958  Great Britain.

BENJAMIN HERSH, *Primary Examiner.*

MILTON L. SMITH, *Assistant Examiner.*